(12) United States Patent
Shields et al.

(10) Patent No.: US 6,680,730 B1
(45) Date of Patent: Jan. 20, 2004

(54) REMOTE CONTROL OF APPARATUS USING COMPUTER NETWORKS

(76) Inventors: Robert Shields, 80 Maple Pl., Keyport, NJ (US) 07735; Steven Stout, 104 Appletree Rd., Howell, NJ (US) 07731

( * ) Notice: Subject to any disclaimer, the term of this patent is extended or adjusted under 35 U.S.C. 154(b) by 0 days.

(21) Appl. No.: 09/236,924

(22) Filed: Jan. 25, 1999

(51) Int. Cl.$^7$ ................................................ G09G 5/00
(52) U.S. Cl. ..................... 345/169; 345/520; 345/522; 345/564; 345/736; 345/740; 345/744; 345/760; 345/968; 345/969; 709/3; 709/201; 709/203; 709/217; 709/225
(58) Field of Search ..................... 345/331, 335, 345/329, 328, 966, 968, 969, 520, 522, 736, 740, 744, 760, 564; 709/218, 203, 217, 225, 104.1, 3, 201

(56) References Cited

U.S. PATENT DOCUMENTS

| | | | |
|---|---|---|---|
| 5,198,806 A | 3/1993 | Lord | 340/825.31 |
| 5,255,313 A | 10/1993 | Darbee | 379/102 |
| 5,366,896 A | 11/1994 | Margrey et al. | 436/48 |
| 5,457,478 A | 10/1995 | Frank | 345/158 |
| 5,624,265 A | 4/1997 | Redford | 434/307 R |
| 5,646,605 A | 7/1997 | Leonaggeo | 340/825.31 |
| 5,673,190 A | 9/1997 | Kahleck | 364/131 |
| 5,692,214 A | 11/1997 | Levine | 395/833 |
| 5,699,494 A | 12/1997 | Colbert | 395/114 |
| 5,715,823 A | 2/1998 | Wood | 128/660.01 |
| 5,752,246 A * | 5/1998 | Rogers et al. | 345/328 |
| 5,764,639 A | 6/1998 | Staples | 370/401 |
| 5,949,412 A * | 9/1999 | Huntsman | 345/329 |
| 5,956,482 A * | 9/1999 | Agraharam et al. | 345/329 |
| 6,043,815 A * | 3/2000 | Simomoff et al. | 345/335 |
| 6,104,392 A * | 8/2000 | Shaw et al. | 345/335 |
| 6,115,741 A * | 9/2000 | Domenikos et al. | 709/217 |
| 6,170,007 B1 * | 1/2001 | Venkatraman et al. | 709/218 |
| 6,175,854 B1 * | 1/2001 | Bretscher | 709/201 |
| 6,185,624 B1 * | 2/2001 | Fijolek et al. | 709/239 |
| 6,199,099 B1 * | 3/2001 | Gershman et al. | 345/968 |

* cited by examiner

Primary Examiner—Richard Hjerpe
Assistant Examiner—Ali Zamani
(74) Attorney, Agent, or Firm—Mandel & Peslak, LLC; Arthur M. Peslak (57) ABSTRACT

A method and software for remote control of computer apparatus is disclosed. The method and software use computer network communications to effect remote control of apparatus that are connected to a computer at a remote location.

18 Claims, 9 Drawing Sheets

REMOTE CONTROL OF APPARATUS USING COMPUTER NETWORKS

BACKGROUND OF THE INVENTION

The present invention is directed to the field of remote monitoring and control of automated apparatus. In particular, the present invention uses a remote based computer to communicate with a computer located in the proximity of the apparatus that actually monitors and controls the apparatus. The computer at the site of the apparatus communicates with the remote computer via the Internet.

The currently available computer based remote control apparatus suffer from the disadvantages of the requirement for unique proprietary client software which must reside on each remote computer demanding access to the base computer. The need for this unique client software encumbers the transfer of monitoring responsibilities from one remote machine to another. Further, the currently available systems suffer from the lack of a multi-platform capability. Currently available implementations are designed for specific computer operating systems (i.e. Microsoft Windows, Apple Macintosh, Sun Solaris, etc.). The present invention avoids platform specific implementation through the use of Web technologies (HTML, Browsers, etc. . . . ), and Java. The available systems also suffer from the absence of a conventional embedded means for providing high level communications security. Conventional Web browsers and servers are now capable of 128 bit encryption, ensuring for extremely secure data communications links.

DETAILED DESCRIPTION OF THE INVENTION

General Description

The invention described herein improves upon previously existing systems for remote computer based monitoring and control of automated apparatus. Although the particular embodiment described relates to security systems, those of ordinary skill in the art will recognize the ready adaptability of the present invention to other types of apparatus. The present invention accomplishes this improvement through innovations in the methods relating to the user interface on the remote unit. Internet Web technologies facilitate this new user interface so that the status and controls of the base unit, typically located in the home, may be accessed within any industry standard web browser from a remote computer. Those of ordinary skill in that art will recognize that Microsoft Internet Explorer, Netscape, Hot Java, etc. can all be used in conjunction with the present invention.

In order to implement a user interface based upon standard web browsers, the system architecture of the present invention incorporates a client-server relationship between a remote computer unit and a base station control computer. The remote client function combines the commonplace marriage of Hypertext Mark Up Language (HTML) with Java language precompiled applets. The present invention also provides user security and authentication through use of password protection, encryption, and signatures, in accordance with current Internet security provisions. The server software, a Java executable program on the base station computer, acts as a web server and simultaneously performs functions to provide real-time input for the web page report representing the status of the base station. This web page also provides for Java applet or HTML based controls to modify the state of individual home-automated systems peripheral to the base station computer.

A primary advantage of the present invention is that it makes use of standard Java enabled web browsers to enable remote access to the apparatus controlled by the base station computer; thereby allowing for selected third party monitoring or control of the automated systems. The ability to utilize a standard web browser represents a tremendous improvement over prior systems in terms of the ease with which one can use a remote computer to access and control the home systems. Similarly advantageous is the ease with which the responsibility can be shared and passed to other computers without the problems associated with installing unique client software, or reconfiguring the users' remote unit.

Description of Sample Use/Operation of the System

Figure 1:
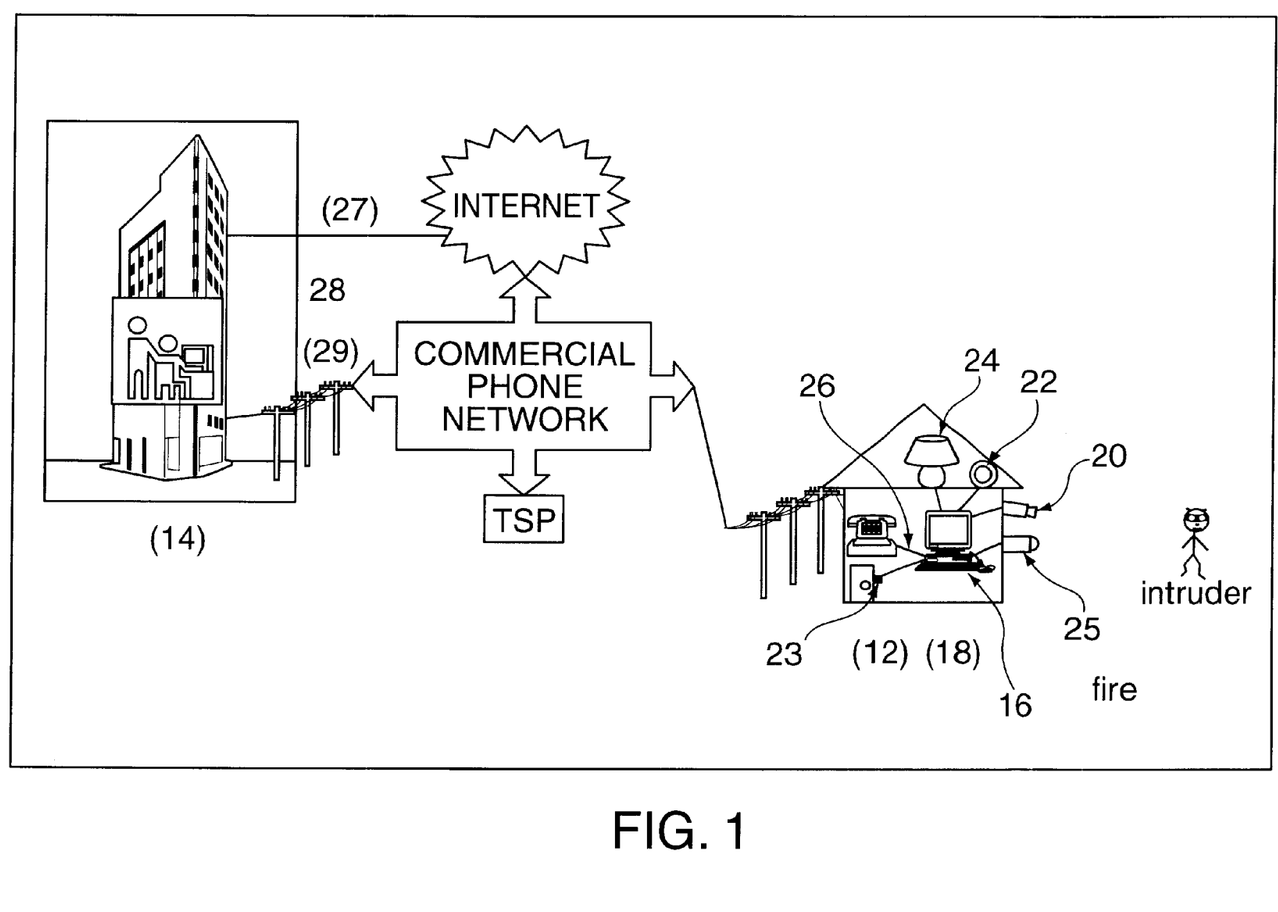
FIG. 1 illustrates the general diagram of the system apparatus of the present invention.

FIG. 1 depicts an embodiment 10 of the invention. This embodiment is utilized to monitor and control home systems 12 from a remote location 14. The home computer 16 is the heart of the base station 18. The base station 18 includes peripheral systems to view a live video feed 20, monitor the fire sensor 22, door sensor 23, and motion detector 25. In addition, other peripherals include a lamp 24 controlled by the server system and a computer telephone modem connection 26 to provide the link to the outside world. The precise configuration and architecture of the base system, regarding choice of sensors, controls, etc.—would be at the users discretion and depend on the users' concerns and needs. However, the present invention can be readily adapted by those of ordinary skill in the art to conform the present invention to the users' precise requirements.

The remote unit 14 and the base station 18 may communicate via the Internet 27 or a straight point-to-point 29 phone connection as described in more detail below and in connection with FIG. 1.

The remote unit 14 illustrated in FIG. 1 could be at any remote location where a computer capable of hosting a conventional web browser and a data communication link back to the base station is located. The location does not have to be fixed for the present invention to work.

Figure 6:
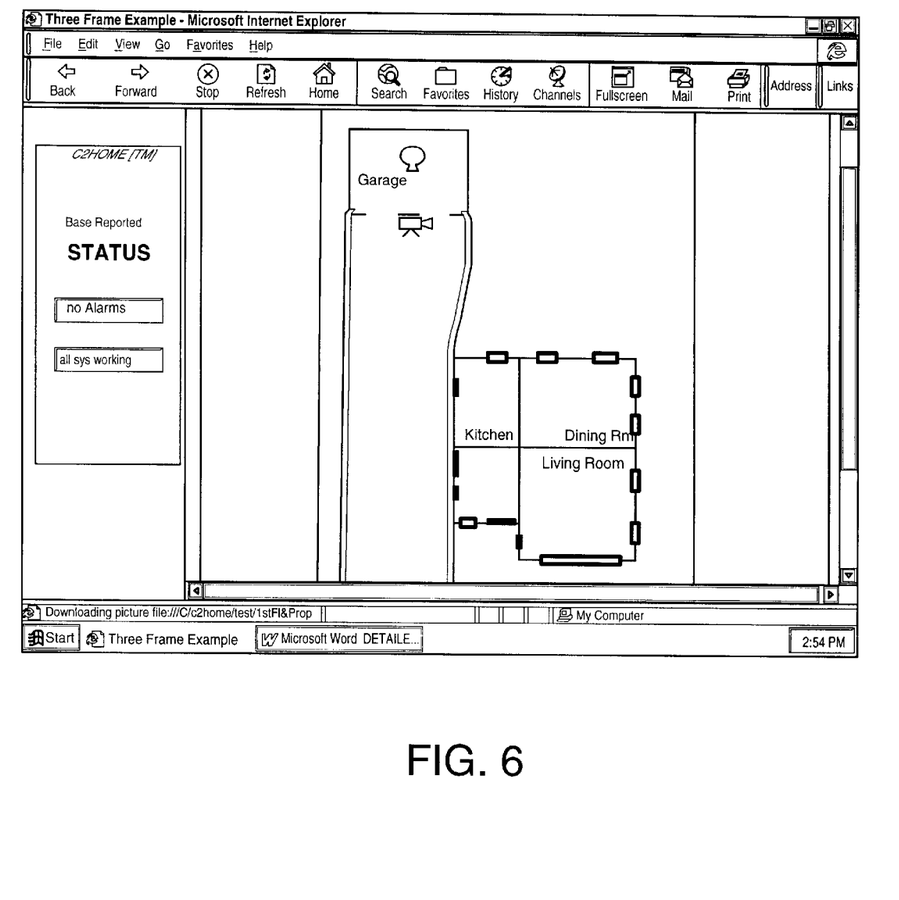
FIG. 6 illustrates a typical web page representation of an embodiment of the present invention.
Figure 7:
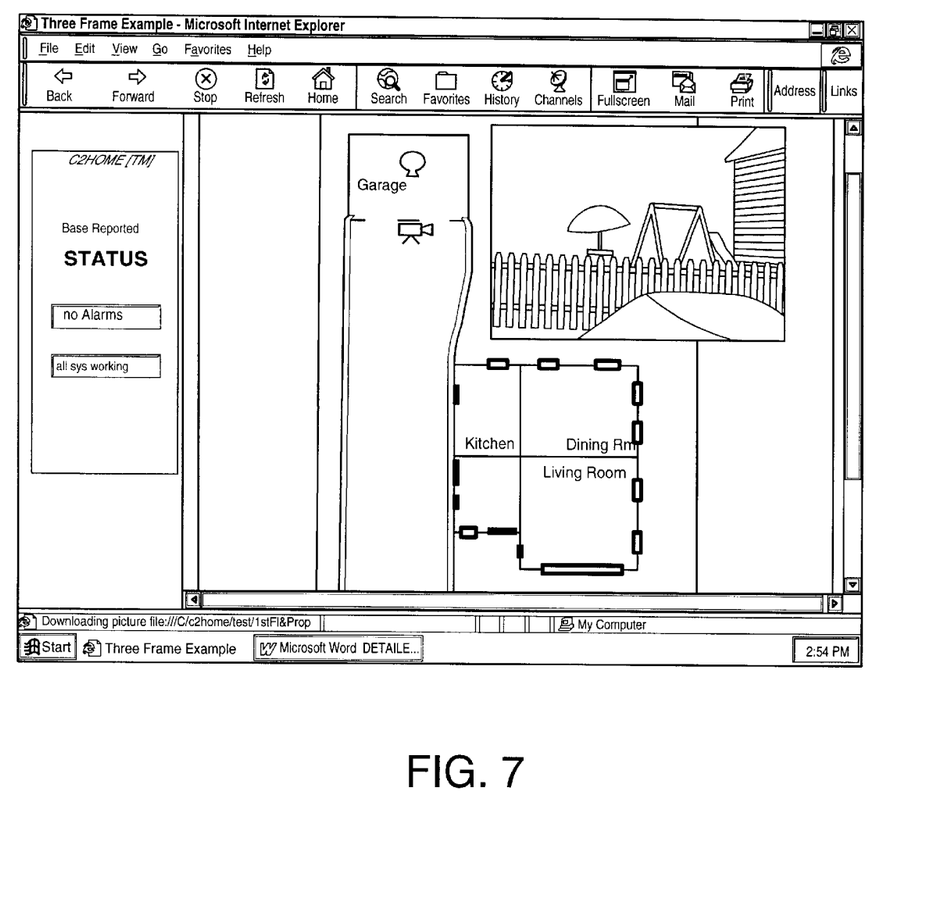
FIG. 7 illustrates a typical web page representation of a live video feed of the present invention.
Figure 8:
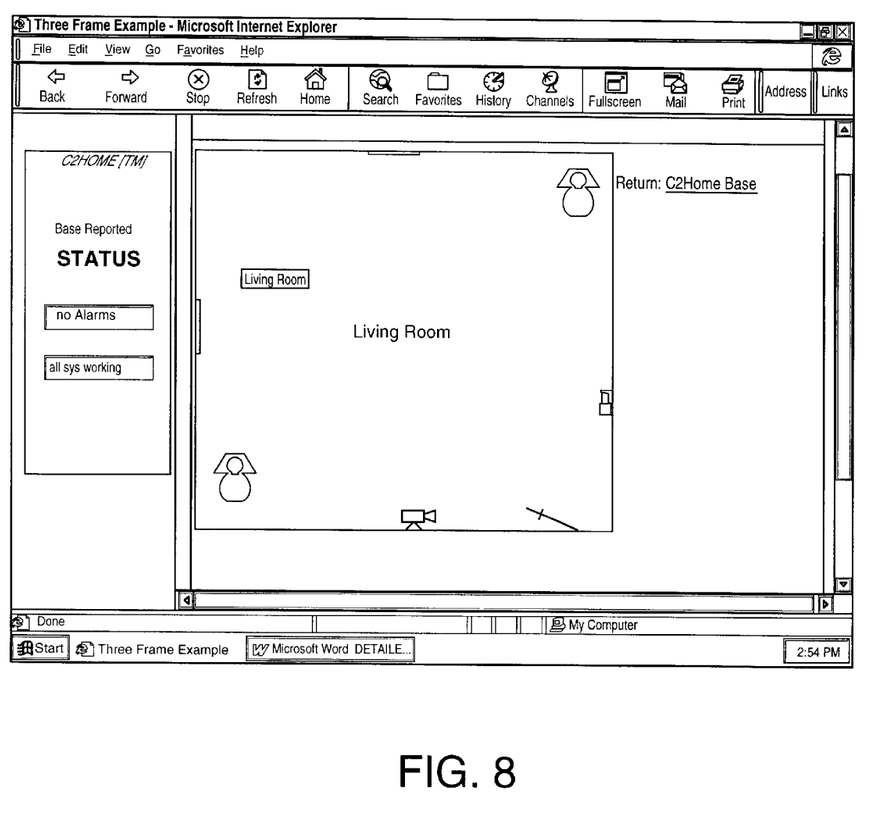
FIG. 8 is a typical webpage representation of an embodiment of the present invention.

The operation of the present invention can be illustrated by a homeowner desiring to check on the status of his home for example. The homeowner, at the remote location 14, would establish a connection with a computer over the data communication link provided through direct point to point phone connection or via Internet Service Provider (ISP), start the web browser on the remote computer 28 and direct the web browser to access the home server 15 home page on the base station computer 16. After responding with appropriate protocol handshaking and passwords etc, the home server 15 on the base station computer 16 serves up the HTML base page to the remote computer 28. The HTML base page indicates the generalized status of the apparatus located in proximity to the home. Generalized status refers to simple icons on the page that will display lamp status (on/off) and the state of any alarms (triggered/or set) for example. A typical base page is illustrated in FIG. 6. Automated devices are represented on the home page by icons which when selected invoke a hypertext reference to either another HTML page or a Java applet which will display detailed status information and/or provide access to the controls for that device.

If the user located at the remote location 14 wants to change the status of any automated appliances attached as peripherals to the system 10, the user may do so by clicking on the appropriate icon on the home page. When the remote user selects an icon in this way, the home server 15 responds by serving up the applet 30, which controls the chosen appliance, thereby providing the remote user a means of selecting the desired state for the appliance, i.e on/off etc. After the remote user chooses the desired state, the home server 15 acknowledges receipt and successful execution of the command to the remote user. The remote user can also access, through hypertext reference, a video applet 32 or HTML page for an actual real time picture.

In the event that an alarm is set off by an intruder or other means, the home server 15 can also be used to notify the homeowner, police, or whoever may be designated. The notification is accomplished by sending a message to the users' pager, calling police with a recorded message, or sending a fax/email to the local police department. Higher-level security systems could use a cellular phone access to avoid the vulnerabilities associated with the potential for severed telephone lines.

Details of Construction

The Server

The present invention 10 uniquely combines recent developments in technology and accepted industry conventions to provide a new means to remotely access and control automated systems. The approach described herein utilizes new developments in Java (technologies) within server-client architecture to access, control, and collect data from the X.10 home automation systems or other standardized automation/security interfaces.

As is well known to those of ordinary skill in the art, the term X-10 refers to a standardized protocol accepted as an industry standard for communication between devices via AC power lines within a single facility. X-10 communicates between transmitters and receivers by sending and receiving signals over the AC power line wiring. These signals involve short RF bursts, which represent digital information.

There are prior systems for performing the X.10 remote control function. However, these prior systems suffer from the disadvantage of requiring unique client software to enable remote clients to access the base station automated systems. By utilizing recent developments in Java technology with HTML technology, the present invention 10 overcomes this disadvantage of requiring particular client software.

The present invention 10 utilizes a standalone Java multithreaded program to perform the server functions on the base station computer 16. This Java based approach is an alternative to the CGI or common gateway interface programs one would normally see to perform tasks on the server which are outside of the scope of HTML functionality. In addition, HTML itself has extremely limited functionality in that it is designed to only serve files upon request to users via TCP socket number 80. CGI could accomplish such tasks as process incoming data or commands via executable programs upon the server. However, these programs would only run when requested by the client invokes execution from the remote location. The multithreaded approach of the present invention yields one single concise, independent executable software program to act as the HTTP server, command processor, event listener, and status server.

Figure 2:
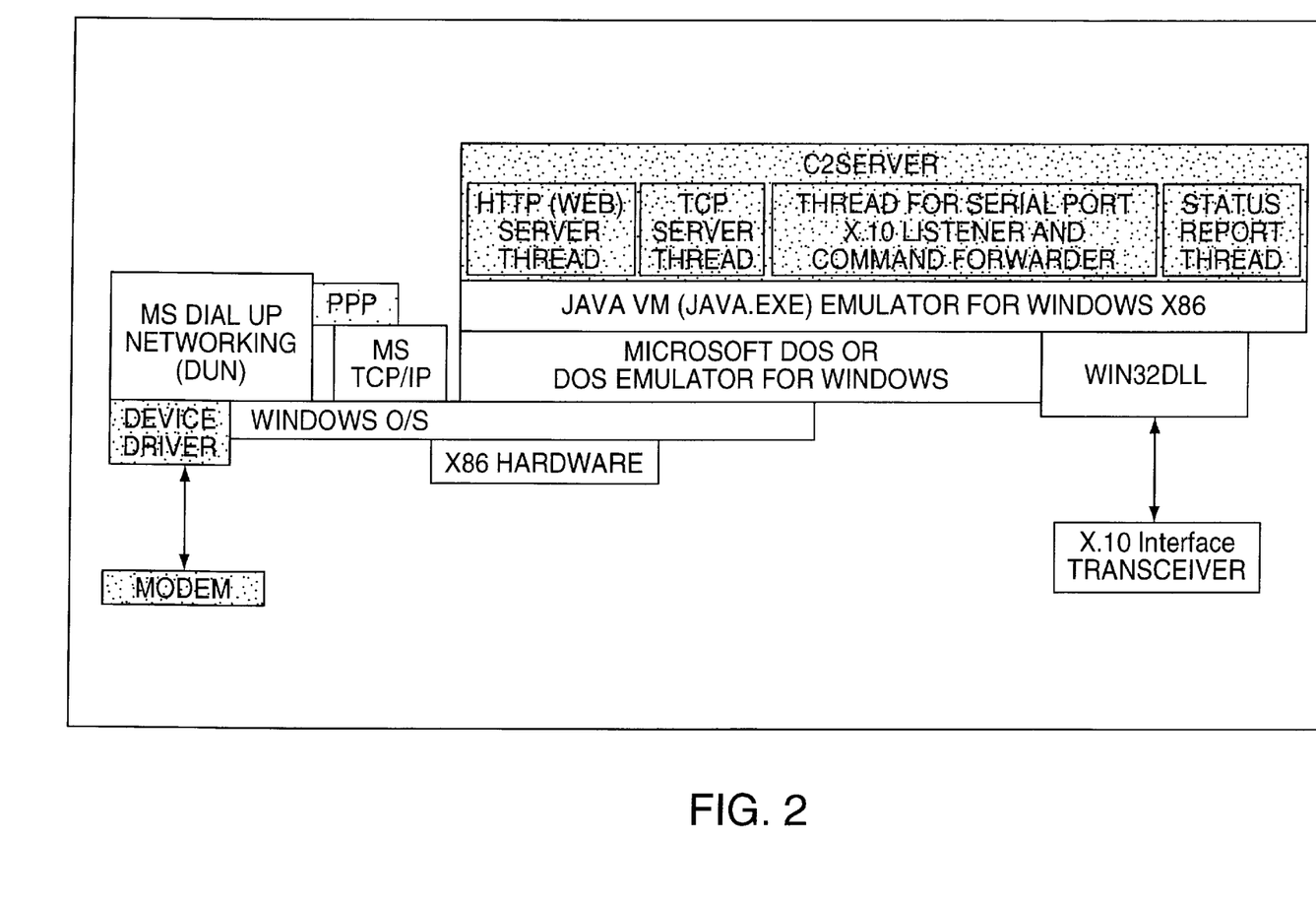
FIG. 2 illustrates the server architecture for use in connection with an embodiment of the present invention.
Figure 3:
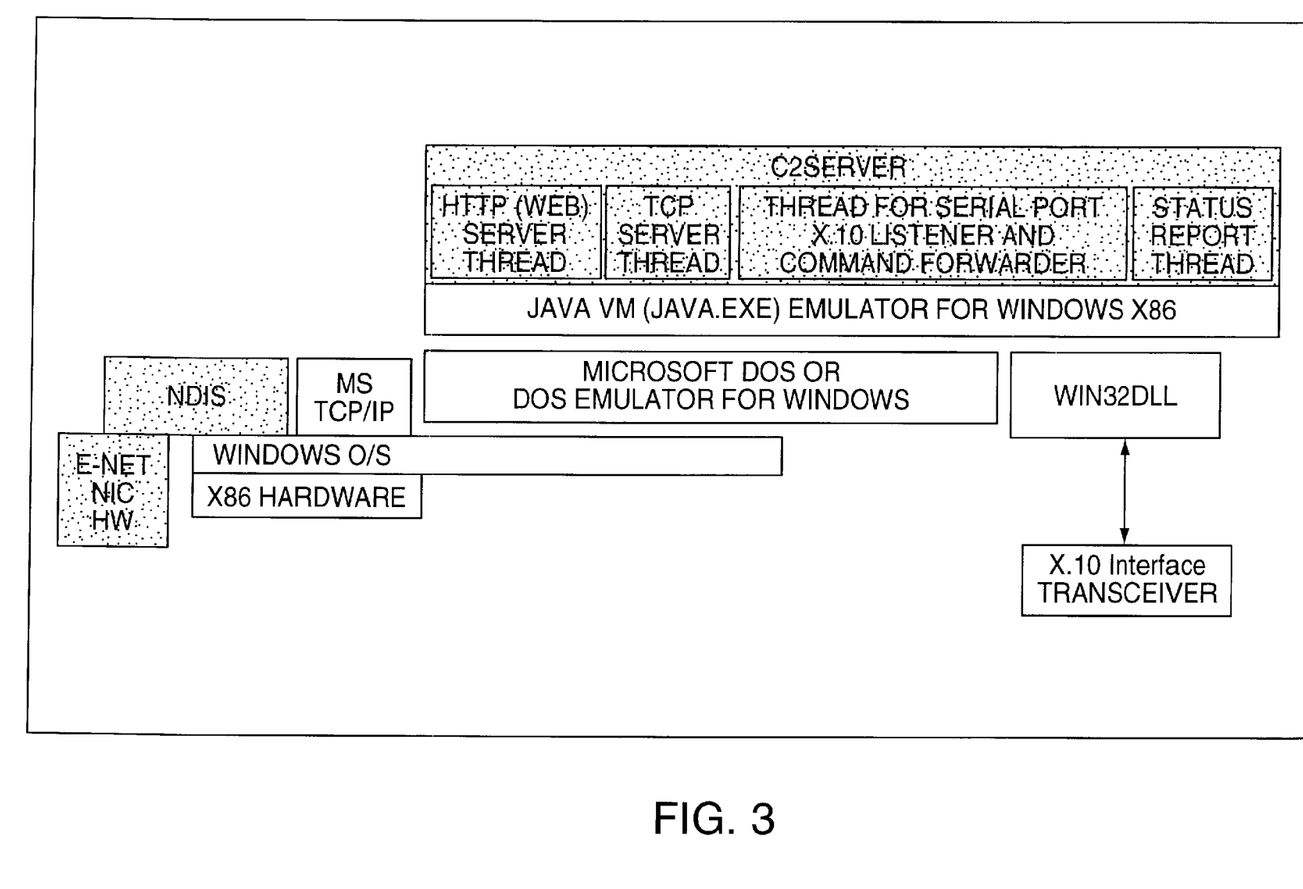
FIG. 3 illustrates the server architecture with access through a LAN connection for use in connection with an embodiment of the present invention.

FIG. 2 illustrates in detail the architecture of the home server 15 of the present invention 10. The base computer 16 has a Microsoft Windows 95 operating system. A Java based C2Server is running within a DOS shell within the WIN95 OS by way of SUN's Java Real-Time Environment (JRE) for WIN386. The Windows 95 operating system on the base computer is running the Microsoft Dial-Up Networking Server application to allow a conventional phone modem access to the base computer. This connection is facilitated via Microsoft's implementation of the TCP/IP protocol service. The subject innovation is essentially provided within the computer software written for the Java C2Server software. The specific tasks performed by the server software are discussed in the narrative associated with the threads identified in FIG. 4.

The preferred embodiment was developed within Borland's (a.k.a. Insight Inc) Jbuilder Java development environment. As is well known to those of ordinary skill in the art, Jbuilder is a programming environment that provides a user interface and thereby eases code development.

The C2Server System of the present invention 10 is initiated on the preferred embodiment by invoking the Java Virtual Machine emulation along with the precompiled Java executable on a DOS command line. Within the preferred embodiment, a classpath must be defined for the location of the class files, which will be referenced by the C2Server source code. The Java Executable initializes all processes and Threads. Appropriate precautions must be taken to allow for proper thread process management (some must be put to sleep occasionally so that others may operate).

The task of developing the home server 15 requires the use of a compiler, which translates Java source code files into the machine code appropriate for the Java Virtual Machine. Such a compiler is usually an integral part of a Java development environment such as the Jbuilder environment utilized to create the preferred embodiment.

As is known to those of ordinary skill in the art, Java is an object-oriented language. As such it makes use of the process of code reuse. Sun's Java Development Kit comes with standard packages, which provide for a common suite of standard Java Objects. Each of the standard packages contains related classes, interfaces, exception definitions, and error definitions. The standard packages include the language package, the utility package, the I/O package, the networking package, the windowing package, the text package, the security package, the RMI package, the reflection package, and the SQL package. The C2Server of the present invention 10 described herein does not make use of all the packages, but rather requires only the language package, the networking package, the I/O package, and the Utilities package. In addition, the C2 Server of the present invention 10 utilizes a SUN Java package known as the Java Communications Extensions which are not usually included with the standard Java Development Kit. The Java Communications Extensions are essential to provide communications to the peripheral devices attached to serial or parallel ports on the base station computer 16. While, the Java Communications Extension kits are available for a variety of platforms, the preferred embodiment employs only the Windows/x86 version.

Figure 4:
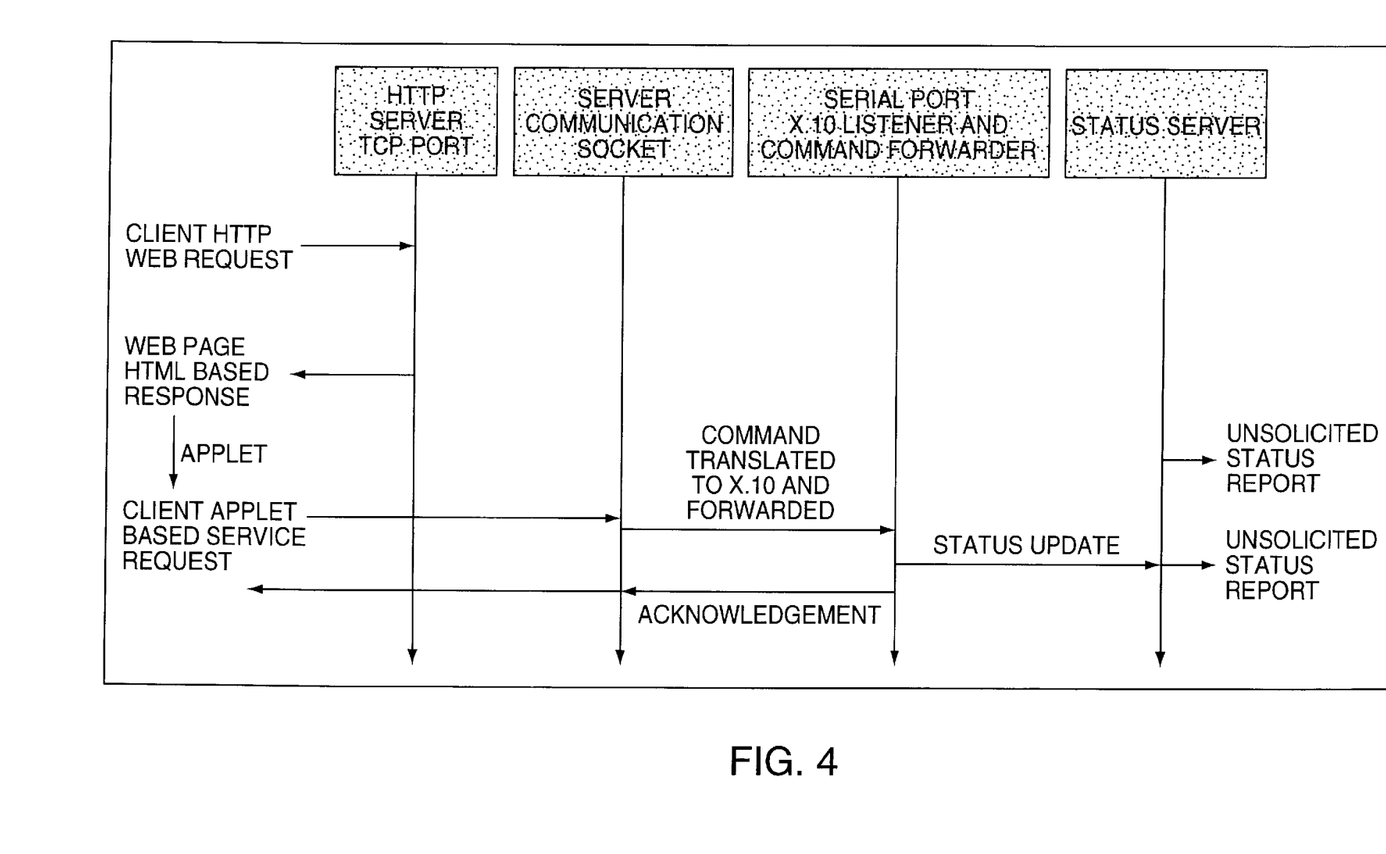
FIG. 4 illustrates the server thread process for use in connection with an embodiment of the present invention.
Figure 5:
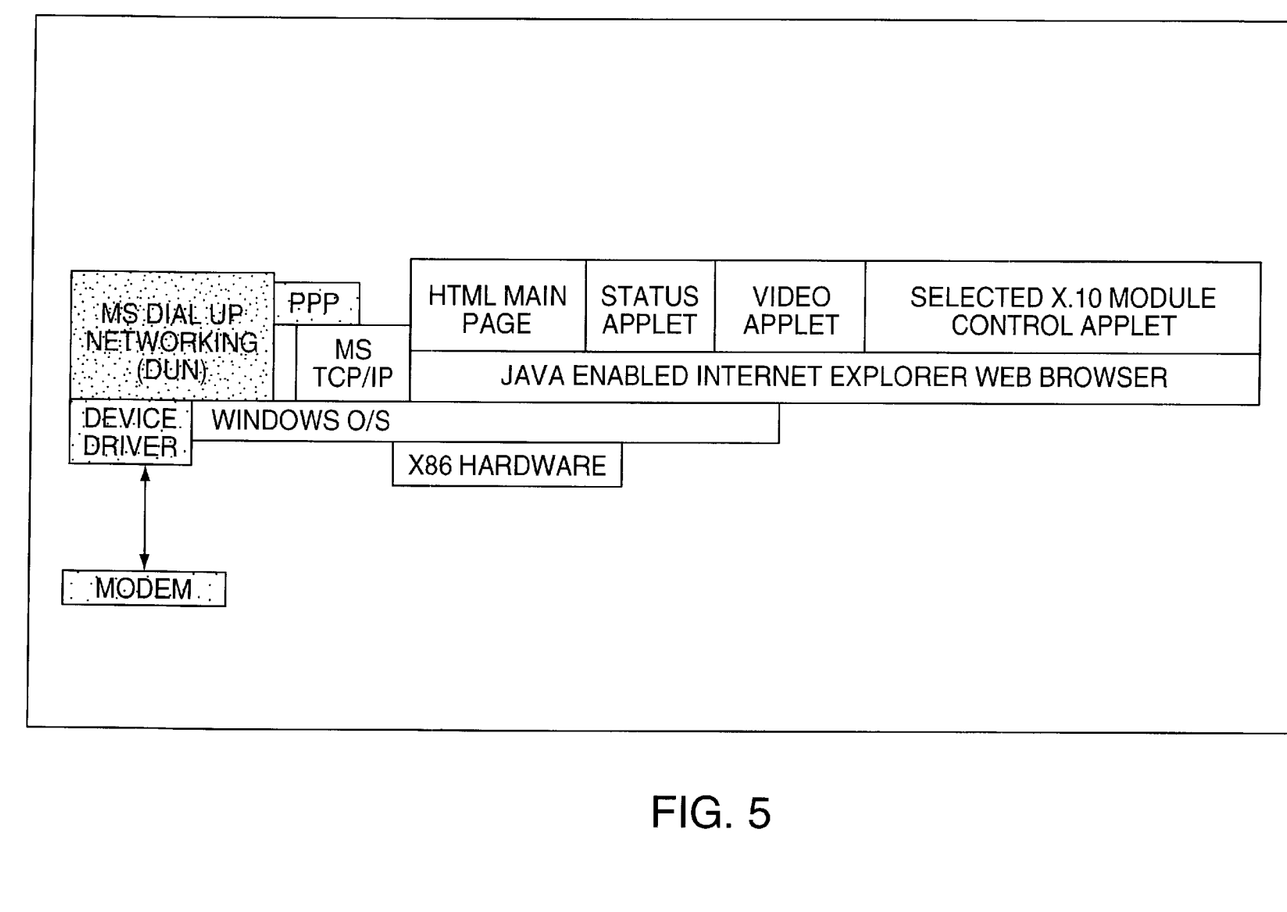
FIG. 5 illustrates typical client architecture through a modem connection for use in connection with an embodiment of the present invention.

The server 15 is not a Java applet but is rather a Java multithreaded standalone executable running on the base machine as illustrated in FIG. 4. The threads represent a way for computer programs to do more than one task at a time within a single computer. Many of the popular computer operating systems such as Windows 95 are multitasking. Similar to the way in which these operating systems are multitasking or provide for multithreading, Java is a multi-threaded programming language in that it allows more than one set of instructions to be executed concurrently. The standard Java classes provides tools and objects to write multithreaded programs and to make these reliable in execution. Within the Java language, only the Java run( ) method has the power attributed to threads (namely the capacity to run independently of other operations).

The multithreading capabilities of the Java programming language provide a significant advantage for the subject server software over prior systems, in that multithreading provides a clean method of writing code for the server to allow for the simultaneous execution of several essential processes. Each thread running within the server 15 performs a unique service to the overall system. Collectively the independent threads simultaneously provide the synergy necessary to perform all the tasks to make up the server 15.

The multithreading capability of Java is essential to the operation of our base station server 15 as a single concise program. This capability allows the program to simultaneously act as the communications server on several ports, e.g., (com1, com2, ethernet port, etc) while monitoring sensor and appliance status. The HTTP Server performs functions similar to any web server in that it utilizes TCP port 80 to respond to requests to transfer the HTML base page to the requesting client. Port numbers originally were not mandated by any governing body but were assigned by convention. The Internet Assigned Numbers Authority (IANA) currently assigns port numbers.

HTTP uses a stream-oriented (TCP) socket connection. HTTP typically utilizes port number 80. All of the HTTP protocol is sent in plain-text format. The HTTP server listens on port 80 for a connection request by the client. There are relatively few methods supported by HTTP. As is well known to those or ordinary skill in the art, a method is a term utilized by object oriented programmers to describe operations that can be done on an object. These include: Get, Head, Post, Put, Delete, Link, and UnLink. This means that these are all the functions that conventional HTML supporting web browsers will allow as commands to conventional web servers without the aid of Java or Active X communication routines. For this reason normal HTML communications are somewhat restricted beyond what is considered necessary to perform the server functions desired for this application.

It is possible to perform functions similar to the supplemental server functions with the use of Common Gateway Interface (CGI) scripts. CGI scripts are executable programs, which are invoked on common web servers to perform unique functions beyond the normal HTML page serving function. Each separate task to be performed must have the CGI initiate a new executable program. In the preferred embodiment, CGI scripts are not used. The preferred embodiment is able to perform the same functions and much more within a single simple Java program because Java is a multithreaded programming language. While this is an approach to the base station server, the preferred embodiment utilizes the Java threading approach due to the simplicity and conciseness in construction and operation. Java also provides some easily employed security measures to protect against computer hackers, imposters, or unintended interception of communications. For example, Java enabled browsers usually use strict measures to ensure security where sockets are concerned. An applet can open a socket only back to the host name from which it was loaded. Attempts by any other host to access the socket will trigger a security exception. The security exception will lead the server to deny the request for communications back from the client applet to the server socket. Java also has a security extension software library to facilitate the writing of Secure Sockets Layer (SSL) communications routines that offer 128 bit encryption. It is well known within the Web and larger Internet industry that 128 bit SSL encryption provides such security that it would require the most sophisticated supercomputers many years to compromise a single transaction.

Another advantage of Java is that it is uniquely architecture independent in that Java programs perform similarly on different computer hardware. Java interpreters exist for Windows95, NT, Apple Macintosh 7.5, Sun Sparc Solaris, and Intel86 Solaris.

Java also offers the capacity to perform actions while the user is viewing the same HTML page. The computer screens cannot be updated automatically with HTML, i.e., you must reload the page. For example, once the page is displayed it cannot change until the Web browser from the remote location requests a new page. HTML based video, for example, repetitively reloads gif or jpeg images to produce motion video. Java, by means of applets, brings the web to life by enabling the web page to perform actions such as communicating with the server 15. Java enables the programmer to create applets which when run within browsers. These applets behave in a similar manner to computer applications running within a standard operating system.

Within the server 15, the Server Communications Socket thread manages any network communications outside the service of any normal HTTP server functions. This thread functions primarily to provide the ability for a real time exchange of data between applets and the server 15.

Figure 9:
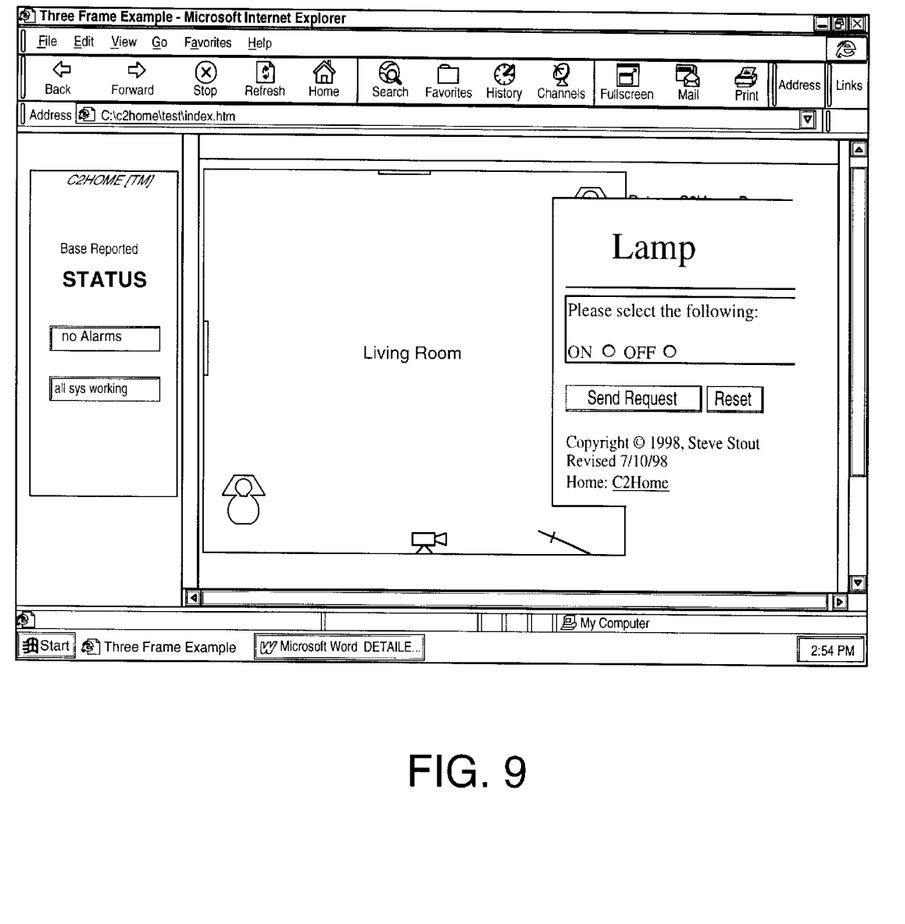
FIG. 9 is a typical webpage representation of an embodiment of the present invention.

The Serial Port and Command Forwarder thread listens to the attached serial port(s) for updates on the status of external devices and receives commands from the Server Comm Socket thread. The Serial Port and Command Forwarder thread then forwards these out the appropriate serial port to alter the state of an external automated device. This is an especially beneficial function because this function can be accomplished without the server having actual knowledge regarding the command set for the external device. This approach further accommodates the idea of applets designed uniquely for each device. FIG. 9 illustrates a control box for a living room lamp that is presented by a java applet when the icon representing a lamp is selected by the computer mouse cursor.

The Status Server thread functions to provide a status report to the client, which has not been specifically solicited by the client. These reports could be periodic or event based. Periodic status could be used for functions such as still frame imagery, while the event based status updates could be used to notify a remote user that the status of an external device has been changed. These reports could include routines to active communications through a conventional pager device or telephone dialer to notify the remote user of an alarm state.

Java Archives (JARs) aid in deploying the overall software package (server and client) by providing all the resources to be utilized within the application to be accessible within a single concise neat compressed file.

The Client

The client 40 is a conventional Web browser hosted upon any computing platform such as the remote station computer 14. The client 40 is used to allow a user access to the information and automation control services being provided by the server. The client 40 accesses the server through conventional communication services. The remote communications may be via a LAN gateway to the Internet or by other means such as direct phone connection (ISDN or Analog).

Within the preferred embodiment, direct client to server communications are provided through the use of Microsoft's Dial-up Networking (DUN) software. The server is running a Dial-Up Server (DUS) program, a subset of DUN, in the multitasking WIN95 environment. The client accesses the DUS via the corresponding DUC (Dial Up Client). It is important that the client 40 and server 15 be configured to accommodate the same communication protocols. Two networking protocols can be used over the DUN connection within the preferred embodiment. These are TCP/IP and Microsoft's NetBEUI. Each networking protocol has unique advantages. Microsoft NetBEUI combined with the Networking Neighborhood allows access to the HTML based status reports and HTML enabled video. TCP/IP provides access to the HTML status through a TCP connection enabled in applets running on the client 40, and the Server Communications socket thread running on the base machine 16.

Java Archives (JARs) decrease the time to download the applet from the server to the remote client by consolidating the applet and associated reference files necessary to run the applet into a single compressed file. The JAR is identified in the HTML page, which is utilized to identify which resources are to be downloaded from the server to the client.

HTML Code for the Master Layout Page shown in FIG. 6:

```
<HTML>
<HEAD><TITLE>Three Frame Example</TITLE></HEAD>
<FRAMESET cols="150, *">
<FRAME SRC="status.statap.html" NAME="STATUS"
SCROLLING="no">
<FRAME SRC="c2home.html" NAME="PROPERTY LAYOUT"
SCROLLING="yes">
</FRAMESET>
</HTML>
```

HTML code for the Map of Property Shown in FIG. 6:

```
<html>
<head>
<meta http-equiv="Content-Type" content="text/html;
charset=iso-8859-1">
<meta name="GENERATOR"
content="Microsoft FrontPage Express 2.0">
<title>C2Home & Office Inc</title>
<!-- Demonstration Sample-->
</head>
```

-continued

```
<IMG ALIGN="LEFT" BORDER=1 SCR="1stFl&Prop.jpg"
ALT="Living Room" usemap="#lvngroom" border="0">
<map name="lvngroom">
<area shape="rect" coords="307,351,416,456" href="lroom.html">
<area shape="poly" coords="189,134,206,133,197,146,188,132,207,132"
href="campage.htm"width=400 height=700>
<area shape="circle" coords="199,86,14" href="lampmod.html">
<area shape="default" nohref>
</map>
</body>
</html>
```

Essential Source Code for the Home Server

```
import java.io.*;
import java.net.*;
import java.util.*;
import HttpServerSocket;
import java.awt.*;
import java.awt.event.*;
import com.sun.java.swing.*;
import javax.comm.*;
// C2 Home Server Java based multithreaded Server.
//C2 Home & Office Inc. Begun 6/98 Bob Shields,
// Steve Stout, Trong Nguyen
// Performs all functions necessary for a home server.
// Uses classes HttpServerSocket and HTTPSocket p/o JDK1.1.6
public class HttpServer {
    public static boolean debug;
    public static int level;
    public static final int HTTP_PORT = 80;
    static Enumeration portList;
    static CommPortIdentifier portId;
    SerialPort serialPort;
    InputStream inputStream;
    OutputStream outputStream;
    public static void main(String args[ ])
    {
        try
        {
            if (args.length > 0)
            {
                if (args[0].equals("debug"))
                {
                    debug = true;
                    if (args.length < 1)
                        level = Integer.valueOf(args[1]).intValue( );
                    else
                        level = 3;
                }
                else
                    debug = false;
            }
            HttpServer server = new HttpServer( );
            server.start( );
        }
        catch (Exception e)
        {
            System.out.println("Exception: " + e);
            e.printStackTrace( );
        }
    }
    /**
     *
     * The server port is hard coded to 80 by HTTP_PORT.
     * Ther Server communications port is port 3570
     */
    public void start( )
    }
        HttpServerSocket serverSocket = null;
        HttpSocket clientSocket = null;
        try
        {
            InetAddress localAddress = InetAddress.getLocalHost( );
```

Essential Source Code for the Home Server

```
        System.out.println("Starting server on " + localAddress);
    }
    catch (IOException ioe)
    {
        System.out.println("Unknown local host: " + ioe);
    }
    try
    {
        serverSocket = new HttpServerSocket(HTTP_PORT, 5);
        System.out.print("Web Server Started\n");
        Thread C2Server = new Server( );
        C2Server.start( );
        System.out.print("communications server started\n");
        portList = CommPortIdentifier.getPortIdentifiers( );
        while (portList.hasMoreElements( )) {
            portId = (CommPortIdentifier) portList.nextElement( );
            if (portId.getPortType( ) ==
            CommPortIdentifier.PORT_SERIAL) {
                if (portId.getName( ).equals("COM1")){
                    ReadWrite readThread = new ReadWrite( );
                }
            }
        }
    }
}
catch (Exception e) {
    e.printStack Trace( );
    System.out.println(
    "Couldn't open listen socket " + HTTP_PORT + " " + e);
    System.exit(10);
}
try
{
    do
    {
        clientSocket = (HttpSocket)serverSocket.accept( );
        System.out.println("Connect from: " + clientSocket);
        ServiceClientRequest(clientSocket);
        clientSocket.close( );
    } while (clientSocket != null);
}
catch (IOException e)
{
    System.out.println(
        "Accept failure on port " + HTTP_PORT + " " + e);
    System.exit(10);
}
}
/**
 * Read the client request and formulate a response.
 */
private void ServiceClientRequest(HttpSocket client(
{
    if (debug && level < 4)
        System.out.println("DEBUG: " + client.describeRequest( ));
    if ( client.method.equals("GET") ||
    client.method.equals("HEAD") )
        ServicegetRequest(client);
    else
    {
        System.out.println("Unimplemented method: " + client.method);
        client.sendNegativeResponse( );
    }
}
/*
 * Get the file stream and pass it to the HttpSocket.
 * Handles GET and HEAD request methods.
 *
 */
private void ServicegetRequest(HttpSocket client)
{
    String mimeType = "application/octet-stream";
    try
    {
        if (client.file.indexOf("..") != -1)
            throw new ProtocolException("Relative paths not supported");
        String fileToGet = "payload" + client.file;
        FileInputStream inFile = new FileInputStream(fileToGet);
```

Essential Source Code for the Home Server

```
        if (fileToGet.endsWith(".html")) mimeType = "text/html";
        if (debug && level < 4)
        {
            System.out.print("DEBUG: Sending " + fileToGet);
            System.out.print(" Size = " + inFile.available( ));
            System.out.println(" Type = " + mimeType);
        }
        client.sendFile(inFile, inFile.available( ), mimeType);
        inFile.close( );
    }
    catch (FileNotFoundException fnf)
    {
        client.sendNegativeResponse( );
    }
    catch (ProtocolException pe)
    {
        System.out.println("ProtocolException: " + pe);
        client.sendNegativeResponse( );
    }
    catch (IOException ioe)
    {
        System.out.println("IOException: Unknown file length: " + ioe);
        client.sendNegativeResponse( );
    }
}
//C2Home Server routine
class Server extends Thread {
    public Server( ){ }
    ServerSocket serverSocket = null;
    Socket clientSocket = null;
    int connects = 0;
    public void run( ){
        do {
            //System.out.print("server called\n");
            try {Thread.sleep(200);}catch(InterruptedException e3){ }
            System.out.print(" server threading\n");
            try{
                // Create the server socket
                serverSocket = new ServerSocket(3570, 20);
                do
                {
                    clientSocket = serverSocket.accept( );
                    System.out.println("Connect from:" + clientSocket);
                    ServiceClient(clientSocket);
                } while (clientSocket!=]null);
                System.out.println("closing socket");
                serverSocket.close( );
            }
            catch (IOException ioe)
            {
                System.out.println("Error in SimpleWebServer: " + ioe);
                ioe.printStackTrace( );
                System.out.println("closing socket");
            try{serverSocket.close( );}catch (IOException h){ };
        }}while (connects < 100);
    } public void ServiceClient(Socket client)
        throws IOException
    {
        BufferedReader inbound = null;
        OutputStream outbound = null;
        System.out.println("Servicing client");
        try
        {
            // Acquire the streams for IO
            inbound = new BufferedReader(
            new InputStreamReader(client.getInputStream( )) );
            String inputLine, recvbuf;
            while ((inputLine = inbound.readLine( )) != null)
            {
                recvbuf = new String(inputLine);
                String recvcut = new String(recvbuf.trim( ));
                System.out.print("string is:" +recvcut);
                System.out.print("compare result:" + recvcut.compareTo("on"));
                System.out.println(recvcut);
                outbound = client.getOutputStream( );
```

-continued

Essential Source Code for the Home Server

```
        outbound.write(inputLine.getBytes( ));
        System.out.println(inputLine);
        outbound = client.getOutputStream( );
        outbound.write(inputLine.getBytes( ));
      }
    }
    finally
    {
      // Cleanup
      System.out.println("Cleaning up connections: " + client);
      outbound.close( );
      inbound.close( );
      client.close( );
    }
  }
}
// --------------------------------------------------------
// comm class ----------------------------------
// --------------------------------------------------------
public class ReadWrite implements SerialPortEventListener{
    public ReadWrite( ){
      try {
        serialPort = (SerialPort)portId.openPort("ReadWriteApp", 2000);
      } catch (PortInUseException e) { }
      try {
        inputStream = serialPort.getInputStream( );
      } catch (IOException e) { }
      serialPort.addEventListener(this);
      serialPort.notifyOnDataAvailable(true);
      try {
        outputStream = serialPort.getOutputStream( );
      } catch (IOException e) { }
        SerialPort.DATABITS_8,
        SerialPort.STOPBITS_1,
        SerialPort.PARITY_NONE);
      } catch (UnsupportedCommOperationException e) { }
    }
public void serialEvent(SerialPortEvent event) {
    switch(event.getEvenType( )) {
    case SerialPortEvent.BI:
    case SerialPortEvent.OE:
    case SerialPortEvent.FE:
    case SerialPortEvent.PE:
    case SerialPortEvent.CD:
    case SerialPortEvent.CTS:
    case SerialPortEvent.DSR:
    case SerialPortEvent.RI:
    case SerialPortEvent.OUTBUF_EMPTY:
      break;
    case SerialPortEvent.DATA_AVAIL:
      byte[ ] readBuffer = new byte[ 80 ];
      try {
        while (inputStream.available( ) > 0) {
          int numBytes = inputStream.read(readBuffer);
        }
        System.out.println(new String(readBuffer));
      } catch (IOException e) { }
      break;
    }
  }
}
```

Sample of Client Applet Demonstrated:

This sample demonstrates an applet which could be invoked by an icon of a lamp on the HTML map of a territory. Once invoked it gives the operator the ability to remotely check status on the lamp, or alter the status to either of two states: on or off.

Similar applets and icons could represent other devices within the home and make use of the server to control or monitor peripheral devices.

```
package client;
import java.awt.*;
import java.awt.event*;
import java.applet.*;
import borland.jbcl.layout.*;
import borland.jbcl.control.*;
import java.io.*;
import java.net.*;
import java.beans.*;
import com.sun.java.swing.*;
// C2Home&Office Inc. R. Shields
// Lamp Module Applet 12/30/98
// Simplified to demonstrate concept essentials
// Shows how java enable web browser may be used to remotely control
an app.
// Uses Cmlla class (included within client package) to provide
encoding for X.10 interface within
// the server environment.
public class c2client extends Applet {
    public Client message;
        public Socket soc; // can this work as public ?
    byte[ ] addrPair = new byte[2]; // for cmlla commands
    byte[ ] funcPair = new byte[2]; // for cmlla commands
    XYLayout xYLayout1 = new XYLayout( );
    boolean isStandalone = false;
    Button button1 = new Button( );
    TextField textField1 = new TextField( );
    public String userString;
    private int hostPort;
    Button button2 = new Button( );
    Label label1 = new Label( );
    Label label2 = new Label( );
    Label label3 = new Label( );
    TextControl textControl1 = new TextControl( );
    TextField textField2 = new TextField( );
    // Construct the applet
    public void c2client( ) {
    }
//Initialize the applet
    public void init( ) {
      try {
        jbInit( );
        message = new Client( );
        message.connect( );
        message.start( );
        //begin with status request 1/2/99~~~~~~~~
          //OutputStream outstrm;
          //Cmlla cmlla = new Cmlla(0,0);
          //textField1.setText("hCode:"+cmlla.getHouseCodeByte( ));
          //textField1.setText("uCode:"+cmlla.getUnitCodeByte( ));
          //addrPair[0] = (byte)cmlla.getHeaderStandardByte( );
          //addrPair[1] = (byte)cmlla.getCodeAddressByte( );
          //message.SendInfo(addrPair);
          //Thread.sleep(100); //Give the device time to respond
          //message.SendInto((byte)cmlla.getOkForXmitByte( ));
          //Thread.sleep(100); //Give the device time to respond
          //funcPair[0] = (byte)cmlla.getHeaderFunctionByte( );
          //funcPair[1] = (byte)cmlla.getCodeStatusRequestByte( );
          //message.SendInfo(funcPair);
          //Thread.sleep(100); //Give the device time to respond
          //message.SendInfo((byte)cmlla.getOkForXmitByte( ));
          //Thread.sleep(100); //Give the device time to respond
          int statcode = 0x8b;
          message.SendInfo((byte)statcode);
          Thread.sleep(100); //Give the device time to respond
          //message.SendInfo((byte)cmlla.getOkForXmitByte( ));
          //~~~~~~~~~~~~~~~~~~~~~~~~
      }
      catch (Exception e) {
        e.printStackTrace( );
      }
    }
//Component initialization
    private void jbInit( ) throws Exceptions {
      xYLayout1.setWidth(400);
      xYLayout1.setHeight(300);
      button1.setFont(new Font("TimesRoman", 1, 18));
      button1.setLabel("ON");
      button1.addMouseListener(new java.awt.event.MouseAdapter( ) {
```

-continued

```
            public void mouseClicked(MouseEvent e) {
                button1_mouseClicked(e);
            }
        });
        textField1.setFont(new Font("Dialog", 0, 10));
        textField1.setText("STATUS");
        button2.setFont(new Font("TimesRoman", 1, 18));
        button2.setLabel("OFF");
        button2.addMouseListener(new java.awt.event.MouseAdapter( ) {
            public void mouseClicked(MouseEvent e) {
                button2_mouseClicked(e);
            }
        });
        label1.setFont(new Font("Dialog", 1, 22));
        label1.setText("C2Home (R)");
        label2.setFont(new Font("Dialog", 1, 12));
        label2.setText("LAMP MODULE APPLET");
        label3.setFont(new Font("Helvetica", 2, 12));
        label3.setText("C2Home & Office Inc.");
        textControl1.setText("REMOTE CONTROL OF
        X.10 LAMP MODULE A1");
        textField2.setText("textField2");
        this.setLayout(xYLayout1);
        this.add(button1, new XYConstraints(26, 172, 104, 35));
        this.add(textField1, new XYConstraints(11, 241, 361, 44));
        this.add(button2, new XYConstraints(249, 173, 102, 34));
        this.add(label1, new XYConstraints(24, 14, 206, −1));
        this.add(label2, new XYConstraints(24, 56, 229, 38));
        this.add(label3, new XYConstraints(233, 16, 163, 20));
        this.add(textControl1, new XYConstraints(30, 123, 270, 19));
        this.add(textField2, new XYConstraints(157, 176, 64, 31));
    }
//Get Applet information
    public String getAppletInfo( ) {
        return "Applet Information";
    }
//Get parameter info
    public String[ ][ ] getParameterInfo( ) {
        return null;
    }
    void button1_mouseClicked(MouseEvent e) {
        //String houseCode = "A";
        //String unitCode = "1";
        int hCode = 0; // house code A
        int uCode = 0; // unit code 1
        OutputStream outstrm;
        Cmlla cmlla = new Cmlla (hCode, uCode);
        textField1.setText("hCode:"+cmlla.getHouseCodeByte( ));
        textField1.setText("uCode:"+cmlla.getUnitCodeByte( ));
        addrPair[0] = (byte)cmlla.getHeaderStandardByte( );
        addrPair[1] = (byte)cmlla.getCodeAddressByte( );
        try {
        // the following sends whatever is in the field button click
        //userString = textField1.getText( );
        // use the following when sending strings to the server (change
form)
        //message.SendInfo(userString);
        message.SendInfo(addrPair);
        Thread.sleep(100); //Give the device time to respond
        message.SendInfo((byte)cmlla.getOkForXmitByte( ));
        Thread.sleep(100); //Give the device time to respond
        funcPair[0] = (byte)cmlla.getHeaderFunctionByte( );
        funcPair[1] = (byte)cmlla.getCodeOnByte( );
        message.SendInfo(funcPair);
        Thread.sleep(100); //Give the device time to respond
        message.SendInfo((byte)cmlla.getOkForXmitByte( ));
        //message.disconnect( );     This is necessary but in the wrong
place
        }catch (Exception f) { }
    }
    class Client extends Thread {
        private Socket soc;
        //public Socket soc; // why not public ? - didn't seem to work
        private boolean running;
        public Client( ){ }
        public void connect( ){
            String    host;
            int       port =3570;
            host = getDocumentBase( ).getHost( );
            try{
                textField1.setText("connecting");
                if (soc == null){
                    soc = new Socket(host,port);
                    textField1.setText("got socket");
                }
            }
            catch (Exception e){
                textField1.setText("Exception:" + e);
                return ;
            }
        }
// this is the string form of this function
//public boolean SendInfo(String msg){
// this version is for byte arrays
public boolean SendInfo(byte[ ] infoPair){
    OutputStream out;
    try {
        out= soc.getOutputStream( );
        // again use the following for the string version
        // out.write(msg.getBytes( ));
        //out.write('\n');
        out.write(infoPair);
        out.write('\n');
        out.flush( );
    }
    catch (Exception e){
        return(false);
    }
    return(true);
}
// this version is for single bytes
public boolean SendInfo(byte info){
    OutputStream out;
    try }
        out= soc.getOutputStream( );
        // again use the following for the string version
        // out.write(msg.getBytes( ));
        //out.write('\n');
        out.write(info);
        out.write('\n');
        out.flush( );
    }
    catch (Exception e){
        return(false);
    }
    return(true);
}
public void run( ) {
    int spot;
    byte inmsg;
    spot = 0;
    //this is handled the same way I did it in the server
    DataInputStream in;
    BufferedReader inbound = null;
    textField2.setText("thread running");
    try{
    in = new DataInputStream(soc.getInputStream( ));
    inbound = new BufferedReader(new InputStreamReader(in));
    String inputLine, recvbuf;
    while((inputLine = inbound.readLine( )) != null)
        {
            textField2.setText("msg recvd");
            recvbuf = new String(inputLine);
            String recvcut = new String(recvbuf.trim( ));
            textField1.setText(recvcut);
        }
    }
    catch (Exception e){ }
}
public boolean disconnect ( ){
    running = false;
    try {
        soc.close( );
    }
    catch (Exception e) {
        return(false);
    }
    return(true);
```

```
        }
      }
    void button2_mouseClicked(MouseEvent e) {
      String houseCode = "A";
      String unitCode = "1";
      int hCode =0; // house code A
      int uCode = 0; //unit code 1
      Cmlla cmlla = new Cmlla (hCode, uCode);
      textField1.setText("hCode:"+cmlla.getHouseCodeByte( ));
      textField1.setText("uCode:"+cmlla.getUnitCodeByte( ));
      addrPair[0] = (byte)cmlla.getHeaderStandardByte( );
      addrPair[1] = (byte)cmlla.getCodeAddressByte( );
      try {
        message.SendInfo(addrPair);
        Thread.sleep(100); //Give the device time to respond
        message.SendInfo((byte)cmlla.getOkForXmitByte( ));
        Thread.sleep(100); //give the device time to repond
        funcPair[0] = (byte)cmlla.getHeaderFunctionByte( );
        funcPair[1] = (byte)cmlla.getCodeOnByte( );
        message.SendInfo(funcPair);
        Thread.sleep(100); //Give the device time to respond
        message.SendInfo((byte)cmlla.getOkForXmitByte( ));
        Thread.sleep(100); //Give the device time to respond
            }catch (Exception f) { }
      }
    }
  }
  public Cmlla( int hCodeIdx, int uCodeIdx ) {
    hCode = codeVal[0];
    uCode = codeVal[0];
    fCode = 0;1
    if( (hCodeIdx >= 0) && (hCodeIdx <= 15) ) {
      hCode = codeVal[hCodeIdx];
    }
    if( (uCodeIdx >= 0) && (uCodeIdx <= 15) ) {
      uCode = codeVal[uCodeIdx];
    }
  }
  public Cmlla( String hCode, String uCode ) {
    if( hCode == "A" ){this.hCode=codeVal[0];}
    if( hCode == "B" ){this.hCode=codeVal[1];}
    if( hCode == "C" ){this.hCode=codeVal[2];}
    if( hCode == "D" ){this.hCode=codeVal[3];}
    if( hCode == "E" ){this.hCode=codeVal[4];}
    if( hCode == "F" ){this.hCode=codeVal[5];}
    if( hCode == "G" ){this.hCode=codeVal[6];}
    if( hCode == "H" ){this.hCode=codeVal[7];}
    if( hCode == "I" ){this.hCode=codeVal[8];}
    if( hCode == "J" ){this.hCode=codeVal[9];}
    if( hCode == "K" ){this.hCode=codeVal[10];}
    if( hCode == "L" ){this.hCode=codeVal[11];}
    if( hCode == "M" ){this.hCode=codeVal[12];}
    if( hCode == "N" ){this.hCode=codeVal[13];}
    if( hCode == "O" ){this.hCode=codeVal[14];}
    if( hCode == "P" ){this.hCode=codeVal[15];}
       if( uCode == "1" ){this.uCode=codeVal[0];}
       if( uCode == "2" ){this.uCode=codeVal[1];}
       if( uCode == "3" ){this.uCode=codeVal[2];}
       if( uCode == "4" ){this.uCode=codeVal[3];}
       if( uCode == "5" ){this.uCode=codeVal[4];}
       if( uCode == "6" ){this.uCode=codeVal[5];}
       if( uCode == "7" ){this.uCode=codeVal[6];}
       if( uCode == "8" ){this.uCode=codeVal[7];}
       if( uCode == "9" ){this.uCode=codeVal[8];}
       if( uCode == "10" ){this.uCode=codeVal[9];}
       if( uCode == "11" ){this.uCode=codeVal[10];}
       if( uCode == "12" ){this.uCode=codeVal[11];}
       if( uCode == "13" ){this.uCode=codeVal[12];}
       if( uCode == "14" ){this.uCode=codeVal[13];}
       if( uCode == "15" ){this.uCode=codeVal[14];}
       if( uCode == "16" ){this.uCode=codeVal[15];}
       fCode = 0;
  }
  public int getFuncAllUnitsOff( )   { return 0; }
  public int getFuncAllLightsOn( )   { return 1; }
  public int getFuncOn( )            { return 2; }
  public int getFuncOff( )           { return 3; }
  public int getFuncDim( )           { return 4; }
  public int getFuncBright( )        { return 5; }
  public int getFuncAllLightsOff( )  { return 6; }
  public int getFuncExtendedCode( )  { return 7; }
  public int getFuncHailequest( )    { return 8; }
  public int getFuncHailAck( )       { return 9; }
  public int getFuncPresetDim1( )    { return 10; }
  public int getFuncPresetDim2( )    { return 11; }
  public int getFuncExtended         { return 12; }
  DataXfer( )
  public int getFuncStatusOn( )      { return 13; }
  public int getFuncStatusOff( )     { return 14; }
  public int getFuncStatusRequest( ) { return 15; }
  public int getInterfaceReadyByte( ) { return interfaceReady; }
  public int getOkForXmitByte( )     { return okForXmit; }
  public int getHouseCodeByte( )     { return hCode; }
  public int getUnitCodeByte( )      { return uCode; }
  public int getFunctionCodeByte( )  { return fCode; }
  public void setHouseCodeByte( int hCodeIdx ) {
    this.hCode = codeVal[0];
    if( (hCodeIdx >= 0) && (hCodeIdx <= 15) ) {
      this.hCode = codeVal[uCodeIdx];
    }
  }
  // standard HEADER:CODE(address) pair
  public int getHeaderStandardByte( ) {
    headerByte = 4;
    return headerByte;
  }
  public int getCodeAddressByte( ) {
    codeByte = ((hCode << 4) + uCode) & 0xff;
    return codeByte;
  }
  // HEADER:CODE(functions) pair
  public int getHeaderFunctionByte( ) {
    headerByte = 6;
    return headerByte;
  }
  public int getCodeAllUnitsOffByte( ) {
    codeByte = ((hCode << 4) + getFuncAllUnitsOff( )) & 0xff;
    return codeByte;
  }
  public int getCodeAllLightsOnByte( ) {
    codeByte = ((hCode << 4) + getFuncAllLightsOn( )) & 0xff;
    return codeByte;
  }
  public int getCodeOnByte( ) {
    codeByte = ((hCode << 4) + getFuncOn( )) & 0xff;
    return codeByte;
  }
  public int getCodeOffByte( ) {
    codeByte = ((hCode << 4) + getFuncOff( )) & 0xff;
    return codeByte;
  }
  public int getCodeAllLightsOffByte( ) {
    codeByte = ((hCode << 4) + getFuncAllLightsOff( )) & 0xff;
    return codeByte;
  }
  public int getCodeStatusOnByte( ) {
    codeByte = ((hCode << 4) + getFuncStatusOn( )) & 0xff;
    return codeByte;
  }
  public int getStatusOffByte( ) {
    codeByte = ((hCode << 4) + getFuncStatusOff( )) & 0xff;
    return codeByte;
  }
  public int getCodeStatusRequestByte( ) {
    codeByte = ((hCode << 4) + getFuncStatusRequest( )) & 0xff;
    return codeByte;
  }
  // not implemented: Dim,Bright,ExtendedCode,HailRequest,HailAck,
  //      PresetDim1,PresetDim2,ExtendedDataXfer
  public int getCRC( ) {
    return ( headerByte + codeByte ) & 0xff;
  }
}
HTML Page Which invokes the client Applet:
<HTML>
<HEAD>
<META HTTP-EQUIV="Content-Type" CONTENT="text/html;
charset=iso-8859-1">
```

-continued

```
<TITLE>
HTML Test Page
<\TITLE>
<\HEAD>
<BODY>
client.Applet1 will appear below in a Java enabled browser.<BR>
<APPLET
    CODEBASE = "."
    ARCHIVE  = client.jar
    CODE     = "client.c2client.class"
    NAME     = "TestApplet"
    WIDTH    = 400
    HEIGHT   = 300
    HSPACE   = 0
    VSPACE   = 0
    ALIGN    = middle
>
<\APPLET>
<\BODY>
<\HTML>
```

Those of ordinary skill in the art will recognize that the embodiments just described merely illustrate the principles of the present invention. Many modifications may be made thereto without departing from the spirit and scope of the invention as set forth in the following claims.

What is claimed is:

1. A method for remotely controlling apparatus and reporting alarms from a remote location using a first computer located in a home, wherein the first computer comprises a multithreaded server program allowing the first computer to control and monitor a plurality of remotely located peripheral devices, a second computer located remotely from the first computer, and a means for communicating data between the first computer and the second computer, comprising the following steps:
   a) accessing the first computer from the second computer by the means for communicating data;
   b) controlling the first computer from the second computer by the means for communicating data;
   c) using the multithreaded server program to control the remotely located peripheral devices from the second computer wherein the second computer provides commands to the first computer and the multithreaded server program is capable of translating the commands to native peripheral device protocols to control the peripheral devices;
   d) monitoring the status of the remotely located peripheral devices from the second computer; and
thereby using information collected by the first computer from the remotely located peripheral devices to consolidate and report status of the peripheral devices to the second computer and to report any alarms from the remotely controlled peripheral devices to the second computer whether or not the second computer actively solicits a report.

2. The Method of claim 1 wherein the means for communicating data between the first computer and second computer is an internet web browser used in connection with a first modem located in the second computer, a second modem located in the first computer, and a communications link between the first modem and the second modem.

3. The Method of claim 1 wherein the plurality of remotely located peripheral devices can include a home thermostat, lighting fixtures, electrical appliances, window or door alarm sensors, passive infrared sensors, and video security cameras.

4. The Method of claim 3 wherein the remotely located peripheral devices are controlled through the first computer by X10 home automation systems.

5. The Method of claim 3 wherein the first computer and the remotely located peripheral devices are controlled through a local area network.

6. The Method of claim 1 wherein the means for communicating data between the first computer and the second computer is a point to point communication.

7. The Method of claim 2 wherein the communications link is by means of an internet service provider.

8. The Method of claim 2 wherein data communicated between a client running within the internet web browser and a server on the second computer is encrypted for security purposes.

9. The Method of claim 1 whereby the first computer may report alarms to a device other than the second computer.

10. A computer based apparatus for remote control of computer controlled peripheral devices comprising:
    a) a first computer comprising a multithreaded server program;
    b) a plurality of peripheral devices located in proximity to the first computer that are monitored and controlled by the multithreaded server program;
    c) a second computer at a location remote from the first computer;
    d) a means for communicating data between the first computer and the second computer;
    e) wherein the second computer comprises an internet web browser program that is used to access and control the first computer through the means for communicating data and thereby monitor and control the plurality of peripheral devices by means of the multithreaded server program wherein the multithreaded server program is capable of translating commands from the second computer to native peripheral device protocols to control the peripheral devices.

11. The computer based apparatus of claim 10 wherein the first computer further comprises an X10 home automation system for controlling the plurality of peripheral devices.

12. The computer based apparatus of claim 10 wherein the plurality of remotely located peripheral devices can include a home thermostat, lighting fixtures, electrical appliances, window or door alarm sensors, passive infrared sensors, and video security cameras.

13. The computer based apparatus of claim 10 wherein the means for communicating data between the first computer and second computer is a first modem located in the first computer, a second modem located in the second computer, and a communications link between the first modem and the second modem.

14. The computer based apparatus of claim 13 wherein the communications link can be selected from a telephone line, a cable television coaxial cable or a DSL connection.

15. The computer based apparatus of claim 10 wherein the first computer and the plurality of peripheral devices are connected go a local area network.

16. The computer based apparatus of claim 15 wherein the second computer is connected to the local area network.

17. The computer based apparatus of claim 10 wherein the apparatus further comprises means for encrypting the data communicated between the first computer and the second computer for security purposes.

18. The computer based apparatus of claim 10 wherein the device is further comprised of means for reporting alarms from the peripheral devices to the second computer whether or not the second computer solicits such reports.

* * * * *